May 12, 1936.　　　J. D. MORGAN　　　2,040,778
COMBUSTION EFFICIENCY ADJUSTING APPARATUS
Filed Jan. 28, 1932
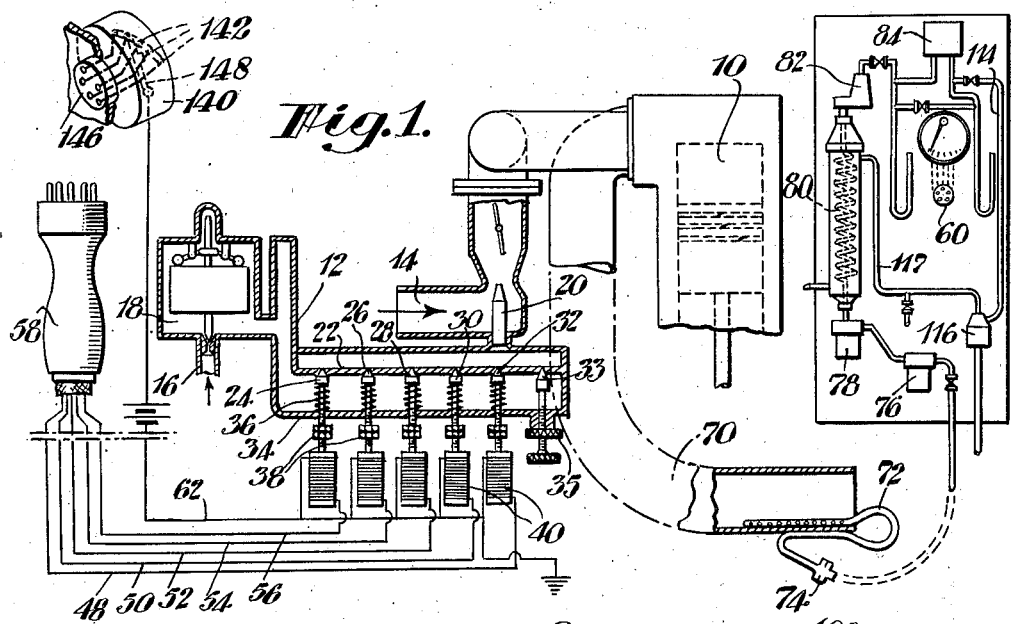
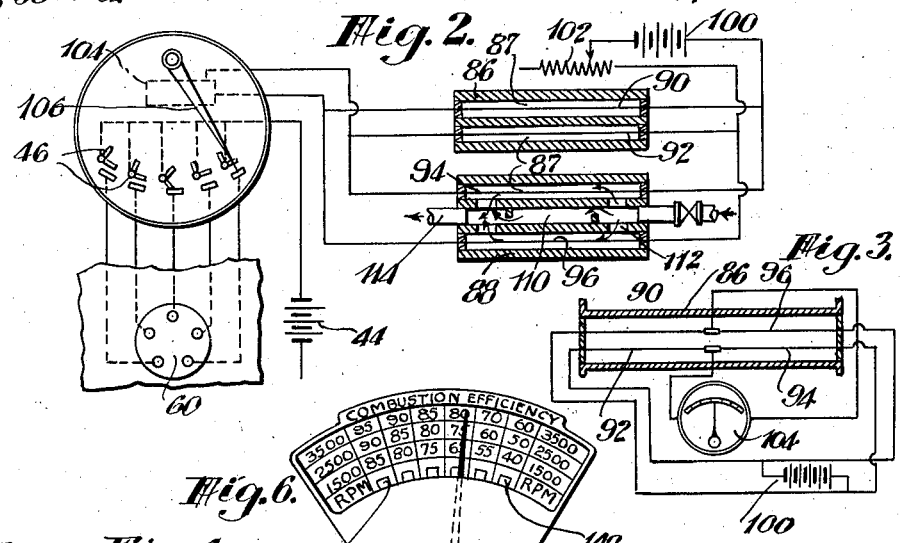
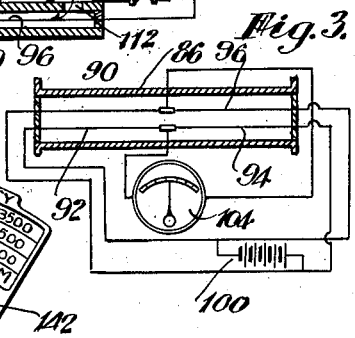
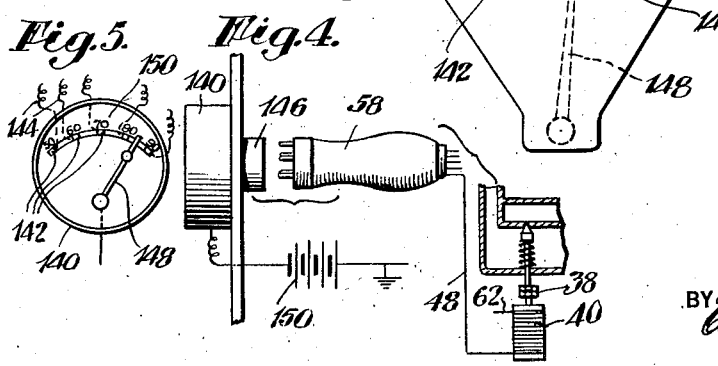
INVENTOR
John D. Morgan
BY Edmund G. Borden
ATTORNEY Patented May 12, 1936

2,040,778

UNITED STATES PATENT OFFICE 2,040,778

COMBUSTION EFFICIENCY ADJUSTING APPARATUS

John D. Morgan, South Orange, N. J., assignor to Doherty Research Company, New York, N. Y., a corporation of Delaware Application January 28, 1932, Serial No. 589,441

2 Claims. (Cl. 123—119)

This invention relates to combustion control, and more particularly it concerns the control of flow of one of the combustion elements to an internal combustion engine in accordance with the composition of the exhaust gases leaving the engine. It is of especial utility in connection with the control of combustion in internal combustion engines of the automotive type which require considerable flexibility in the control of operation.

In accordance with this invention there is provided a continuous measurement of the combustible constituents present in the exhaust gases, effected by passing such gases, undiluted, in contact with electrically-heated catalytic wires of suitable metal or alloy, the latter of which is connected in a circuit with a resistance-measuring instrument. The temperature change taking place in the wire when the undiluted exhaust gases are passed thereover,—which change is dependent upon the thermal conductivity of the exhaust gas mixture,—causes a corresponding change in the electric resistance of the catalytic wire. This change in electric resistance is measured by a Wheatstone bridge or similar device for measuring small resistance changes; and the values serve as a measure of the combustible constituents present in the exhaust gases.

The thermal conductivities of gases have heretofore been measured for determining the amount of a single gas present in another gas, as in the determination of methane in the air of mines. In the past it has been observed that when such gases were examined, the results were very variable when the gas contained substantial amounts of such gases as CO, $H_2$, $CH_4$, and the like.

The present invention is based in part upon the discovery that the thermal conductivities of gas mixtures containing substantially the same ingredients in varying proportions may successfully be employed to indicate accurately the per cent of reducing gases in the gas mixture and the completeness of the combustion that produced such gases.

Among the more important objects of the present invention are:

To provide for the employment of novel thermal conductivity measuring means for rapidly indicating and controlling the carburetion of fuel flowing to an internal combustion engine;

To provide for the ready calibration of the carbureter of an internal combustion engine to permit its subsequent ready adjustment; and To provide in novel manner for instantly adjusting the flow of fuel or air to an engine, thus selecting engine combustion efficiencies at the will of the operator.

In the accompanying drawing:

Fig. 1 illustrates diagrammatically a preferred form of gas analyzing apparatus and the associated parts of a carbureter and internal combustion motor;

Fig. 2 shows diagrammatically parts of a gas analyzer electric circuit and associated parts;

Fig. 3 is a diagrammatic representation of another gas analyzer electric circuit embodying the invention;

Fig. 4 shows diagrammatically a combustion efficiency selector instrument and associated parts;

Fig. 5 is a front view of the dial shown in Fig. 4; and

Fig. 6 is a front view of another form of dial.

In the drawing, numeral 10 indicates the cylinder of an internal combustion motor of well-known type. Connected with the intake manifold thereof is a multiple jet carbureter 12 provided with the usual air inlet 14, fuel inlet 16, float chamber 18, and main jet 20. Located in the lower part of the carbureter below the level of the main jet 20 and float chamber 18 is a plate 22 having a plurality of small openings provided therein, each being adapted to accommodate one of a plurality of needle valves 24, 26, 28, 30, and 32, the stems of which extend downwardly through the floor 34 of the carbureter and are adapted for sealing and unsealing the openings in the perforated plate. A needle valve 33, having an adjusting and locking member 35 serves for fuel feed during the idling of the motor.

Each of the carbureter needle valves 24, 26, 28, 30, and 32 is provided with a compression spring 36 adapted normally to maintain the valves in closed position with respect to the perforated plate 22. The mid part of the shaft of each needle valve is threaded and provided with a locking member 38; and each is provided with one of a plurality of solenoids 40, each of the latter being arranged in parallel in an electric circuit that includes a source of electric current 44, a series of throw switches 46, 46, and a series of lead wires 48, 50, 54, 56, and 62, the arrangement of parts being such that by closing one or more of the switches 46, 46, any selected one or more of the solenoids 40 can be energized to open the corresponding valve or valves against the resistance of the springs 36.

For this purpose one lead wire from each solenoid is connected with one of the switches 46 by means which, in the form shown in Figs. 1 and 4, includes multiple contact detachable plug and socket members 58, 60. The other lead wire 62 from each solenoid is grounded as indicated. The switches 46 may conveniently be located upon the galvanometer casing 104 as shown.

Leading from the exhaust pipe 70 of the engine is a sampling tube 72, more particularly shown in Fig. 1,—provided with holes drilled in the top and sides but having its forward end closed. An orifice 74 is provided in the sampling device and serves to muffle and smooth out the pulsations in pressure occurring in the exhaust gases, so that the pressure beyond the sampling device is substantially constant. This sampler is more fully described in my copending application Serial No. 482,283, filed September 16, 1930.

The gas sample thus obtained is then prepared for passage through a thermal conductivity measuring cell of the character hereinafter disclosed. This is accomplished by flowing it through a water separator 76 and from thence successively through an oil filter 78, wherein it is scrubbed, and through the coils of a cooler 80 wherein it is cooled to a constant temperature. From the cooler the gas sample passes through a main filter 82, preferably filled with mineral wool wherein any dust, carbon, water vapor, oil and the like is removed. The gas sample then flows to a thermal conductivity measuring apparatus 84.

The form of thermal conductivity measuring apparatus shown in Fig. 2 comprises a pair of tubes or cells 86, 88, of suitable material having sealed ends. Each tube has a pair of passageways 87 extending therethrough, through which extend the respective fine wires 90, 92, 94, 96 of catalytic metal or alloy. The wires may be straight or helical, and are equally spaced from the walls of the passageway. Each of these catalytic wires is in a Wheatstone bridge circuit which includes a source of electric current 100, a variable resistance 102, and the galvanometer 104 having the indicator member 106.

The tube 88 also has a central passageway 110 and connecting passageways 112,—the arrangement being such that the cooled and filtered exhaust gases being examined flow through this tube in contact with the heated catalytic wires 94, 96 therein, and an amount of heat is removed from the hot wires by the gases in passing, in accordance with the thermal conductivity of the said gases at the temperatures employed.

The wires 92 and 94 are fixed resistance elements which are equal and of any suitable value, and together they represent one leg of the Wheatstone bridge. If desired, both of these wires 92, 94 may be placed within a single one of the tubes 86 or 88. Furthermore all of the wires, 90, 92, 94, 96 forming the Wheatstone bridge circuit may be placed in a single tube, as shown in Fig. 3, the said tube being adapted to be traversed by a current of the exhaust gases to be analyzed.

Positioning the fixed resistance elements 92, 94, within one or both of the tubes 86, 88, where they are exposed to the same high temperature, makes possible the use of short wires for the fixed resistances, well adapted for use with a compact form of gas analyzing instrument. The gas outlet conduit 114 from the tube 88 leads through an aspirator 116 to waste; and a uniform suction is maintained on the system by means of the said aspirator, the latter of which may be fluid-flow operated by the water flowing from the cooler 80 through line 117 as shown.

The tube 86 is filled with a comparison gas of known thermal conductivity. Preferably one is employed having a thermal conductivity substantially higher or lower than the thermal conductivities of any mixture of gases normally exhausted from an internal combustion motor. Hydrogen, having a thermal conductivity of 15.9 may be satisfactorily employed,—as may helium, argon, neon and other gases having high thermal conductivities, or mixtures thereof. A noninflammable mixture of hydrogen and helium may, for example, be employed. Likewise carbon dioxide, having a thermal conductivity of 1.37 is suitable for use in accordance with the invention. Certain other gases such as air may be less advantageously employed.

The following table indicates that, in the type of combustion effected in an internal combustion motor wherein an excess of combustible constituents over air always is maintained, the exhaust gases produced at combustion efficiencies of from 50–100% will vary in thermal conductivity within a narrow range of from around 2.15 to 3.17.

| Thermal conductivity | Percent of of reducing gases | Percent completeness of combustion |
|---|---|---|
| 2.15 | 0 | 100 |
| 2.18 | 1.5 | 95 |
| 2.27 | 3.1 | 87 |
| 2.51 | 9.0 | 75 |
| 2.72 | 12.7 | 67 |
| 3.17 | 21.7 | 50 |

In practice, the carbureter is calibrated in terms of combustion efficiency by operating the motor and passing the purified exhaust gases at uniform rate and temperature through the thermal conductivity cell 88 in contact with the hot wires therein. These gases then flow to waste. The variation in resistance in the current flowing in the wires is measured upon the galvanometer 104 in terms of combustion efficiency of the motor, the galvanometer having been previously calibrated in such terms against a suitable standard. The respective carbureter needle valves are then successively manually operated by means of the switches 46, 46, and the combustion efficiency of the motor utilizing the resultant gas mixture is read on the galvanometer dial. Each of the needle valves has an opening of a different size from the others. The openings controlled by the respective valves may range, for example, from size #20 to #26 or #28 depending upon the design of engine and carbureter and the nature of the duty performed by the engine.

After calibration of the respective carbureter needle valves, that valve is left open which results in carburetion giving the desired combustion efficiency in motor operation at the selected engine speed. If desired, the needle valve may be locked in open position by means such as the locking member 38, or it may be held open by the solenoids in the following or similar manner:

Mounted at some point preferably close to the carbureter, as for example on the dash-panel of an automobile or on a control board in an engine room, is provided a combustion efficiency selector instrument 140 consisting of a plurality of contact points 142, 142, corresponding to the fixed contact points of the switches 46, 46 of the galvanometer, and connected through the respective wires 144, 144 with a socket member 146 corresponding to the socket member 60 of Figs. 1 and 2.

A swingable switch arm 148 is arranged selectively to contact with each of the contact points 142 and to establish a circuit which will include a battery 150 or other source of electric current, and one of the solenoids 40. In this manner, after once having determined by means of the combustion efficiency instrument the particular combustion efficiency most suitable for operation of the internal combustion engine under a given set of conditions,—the motor may be operated at that combustion efficiency as long as desired. At the same time it is possible, merely by moving the switch member 148 of the combustion efficiency selector instrument 140, to change instantly the carbureter adjustment to give a selected higher or lower combustion efficiency for as long a period as may be desired.

The arm 148 can be placed in off position to break the circuit when desired. Two or more arms 148 can be used concurrently when it is desired to simultaneously operate more than one solenoid.

The instrument 140 is provided with a calibrated scale 150 on which may be recorded the combustion efficiency resulting from the operation of the respective valves 24, 26, 28, 30, and 32 or by any combination thereof. The calibration of this instrument preferably is made at a selected engine speed and load.

The combustion efficiency of a motor fed by fuel flowing through any particular valve or valves will vary somewhat with the speed of the motor and with the load thereon, as indicated in the following tables in which are recorded the results of tests upon the motor exhaust gases of two well-known makes of automobiles:

*Light automobile motor*

| Full load | | No load | |
|---|---|---|---|
| Speed | Combustion eff. | Speed | Combustion eff. |
| R. P. M. | Percent | R. P. M. | Percent |
| 900 | 85 | 900 | 65 |
| 1350 | 88 | | |
| 1800 | 94 | 1800 | 72 |
| 2250 | 93 | | |
| 2700 | 88 | 2700 | 76 |

*Heavy automobile motor*

| Full load | | No load | |
|---|---|---|---|
| Speed | Combustion eff. | Speed | Combustion eff. |
| R. P. M. | Percent | R. P. M. | Percent |
| 900 | 59 | 900 | 87 |
| 1800 | 69 | 1800 | 93 |
| 2700 | 74 | 2700 | 90 |

If the carbureter needle valves are to be calibrated at each of a plurality of engine speeds, a scale of the character of that shown in Fig. 6 may be used with the selector instrument.

In the continued normal operation of a motor, the combustion efficiency thereof gradually changes, due to such conditions as fouled spark plugs, faulty ignition, and to gum deposits and other obstructions in the carbureter and motor cylinders. Periodically, therefore, it is desirable to check the combustion efficiency of the engine. This can be done easily when desired by removing the plug 58 from the socket 146 of the combustion efficiency selector instrument and connecting it with the socket 60 in the galvanometer circuit of the gas analyzing apparatus.

Any carbureter needle valve if locked in open position is now released, and is then closed by its spring. The idler valve is not changed after once being properly adjusted.

Exhaust gases are now withdrawn from the motor exhaust line and are cooled and cleaned in the manner hereinbefore described, after which they flow at a selected rate through the gas analyzer tube 88. The motor is then adjusted to run in the range of R. P. M. at which it is desired to measure the motor efficiency.

Successively each of the needle valves is manually held open, and the combustion efficiency of the motor read on the galvanometer dial. The indicated combustion efficiencies are then recorded at the proper contact points upon the combustion efficiency selector panel. When the combustion efficiencies effected through the various valves are determined at more than one engine speed, they are recorded upon the selector panel shown in Fig. 6.

The catalytic wires within the tubes 86, 88 preferably are of platinum or of alloys of platinum with from 1 to 10% of rhodium, palladium or iridium, especially where gas mixtures are to be analyzed containing 20% or more of combustible constituents, as in the case of many motor exhaust gases.

These catalytic wires are designed to function at temperatures above those at which any condensation of moisture begins to occur in the tubes housing them,—but below those temperatures around 750° F. at which thermal decomposition of hydrocarbon components occur. Temperatures around 250° C. are especially suitable for use.

It will be understood that, if desired, the control circuits may be adapted for operation from the usual lighting circuit through rectifier and eliminator units, as described in my aforementioned application.

The present invention may be used in controlling combustion in a wide variety of heating operations employing either under- or over-ventilation. In the case of over-ventilation, air is not suitable for use in the comparison cell 86. Hydrogen or helium, however, is satisfactory for the purpose.

It will be seen that the present invention not only provides an instrument adapted for quickly and accurately determining the percentage of reducing gases present in exhaust gases, and the completeness of combustion, but in addition it enables the operator to preserve in a combustion-control selector instrument remote from the gas analyzer a record of such adjustment directly in terms of completeness of combustion. This enables the operator quickly and intelligently to adjust to a desired degree the combustion efficiency of a motor, even in the absence of a combustion-efficiency measuring instrument, the latter of which need only be employed at remote intervals.

Although there has been described herein a specific embodiment of the invention, it will be obvious to those skilled in the art that various modifications may be made in the details of construction and in the details and organization of the several cooperating parts without departing from the principles herein set forth.

The invention is susceptible of modification within the scope of the appended claims:

1. In combination, an internal combustion motor having an exhaust pipe and a carbureter equipped with valves for controlling the supply of an element of combustion to the motor, a gas analyzer adapted for operative connection to the motor exhaust pipe and including as an element thereof an instrument for measuring the proportion of combustible present in the exhaust gases, an electrically controlled actuating element for the carbureter valves, a calibrated combustion efficiency selector embodying a multi-contact switch connected in electrical circuit with said valve actuating element, and means adapted to operatively connect the valve actuating element with the measuring instrument of the gas analyzer.

2. In combination, an internal combustion motor having an exhaust pipe and a carbureter equipped with a valve for controlling the supply of an element of combustion to the motor, a gas analyzer adapted for operative connection to the motor exhaust pipe and including as an element thereof an instrument for measuring the proportion of combustible present in the exhaust gases, an electrically controlled actuating element for the carbureter valve, a calibrated combustion efficiency selector connected in electrical circuit with said valve actuating element, and means adapted to operatively connect the valve actuating element with the measuring instrument of the gas analyzer.

JOHN D. MORGAN.